United States Patent
Kaneko

[19]
[11] Patent Number: 5,833,154
[45] Date of Patent: *Nov. 10, 1998

[54] LINE LENGTH MEASURING DEVICE FOR FISHING REEL

[75] Inventor: Kyoichi Kaneko, Tokyo, Japan

[73] Assignee: Daiwa Seiko, Inc., Tokyo, Japan

[*] Notice: The term of this patent shall not extend beyond the expiration date of Pat. No. 5,236,147.

[21] Appl. No.: 606,554

[22] Filed: Feb. 26, 1996

Related U.S. Application Data

[63] Continuation of Ser. No. 430,176, Apr. 27, 1995, abandoned, which is a continuation of Ser. No. 346,847, Nov. 30, 1994, abandoned, which is a continuation of Ser. No. 242,032, May 12, 1994, abandoned, which is a continuation of Ser. No. 949,717, Sep. 23, 1992, abandoned.

[30] Foreign Application Priority Data

Oct. 9, 1991 [JP] Japan ................................ 3-262155

[51] Int. Cl.$^6$ ................................................. A01K 89/00
[52] U.S. Cl. .............................................................. 242/223
[58] Field of Search .................................. 242/223, 323, 242/305

[56] References Cited

U.S. PATENT DOCUMENTS

| | | | |
|---|---|---|---|
| 4,585,182 | 4/1986 | Atobe | 242/223 |
| 4,697,758 | 10/1987 | Hirose et al. | 242/223 |
| 4,790,492 | 12/1988 | Atobe | 242/223 |
| 4,934,628 | 6/1990 | Yamaguchi | 242/223 |
| 5,236,147 | 8/1993 | Kaneko | 242/223 |
| 5,363,565 | 11/1994 | Kaneko . | |

FOREIGN PATENT DOCUMENTS

| | | |
|---|---|---|
| 55-9676 | 7/1980 | Japan . |
| 55-140373 | 10/1980 | Japan . |
| 56-48839 | 5/1981 | Japan . |
| 57-155931 | 9/1982 | Japan . |
| 59-117365 | 8/1984 | Japan . |
| 60-52704 | 3/1985 | Japan . |
| 60-98377 | 7/1985 | Japan . |
| 60-114666 | 8/1985 | Japan . |
| 60-244247 | 12/1985 | Japan . |
| 61-99813 | 5/1986 | Japan . |
| 40-4091735 | 3/1990 | Japan .................................... 242/305 |
| 40-6217667 | 8/1994 | Japan .................................... 242/223 |

*Primary Examiner*—Eileen A. Dunn
*Attorney, Agent, or Firm*—Kalish & Gilster

[57] ABSTRACT

A line length measuring device for a fishing reel to measure the fishing line amount let out or wound based on the number of spool revolutions and has as an object the line length measurement regardless of the length of the fishing line. The present invention comprises a reel, a spool which is rotatably supported by the reel and onto which the fishing line is wound, a sensor to detect the revolutions of the spool, an up-down counter to count up or down the pulse signal output from the sensor, a specified level counter to count the number of spool revolutions when the fishing line is wound up to the specified winding level smaller than the maximum winding diameter of the fishing line for the spool and the total number of spool revolutions corresponding to the total length of the wound line using the up-down counter, a microcomputer to store the counted values, the microcomputer also to determine the line length based on the line length formula obtained from the number of spool rotations up to the above specified winding level and the total number of spool revolutions corresponding to the total length of the wound line as well as on the actual number of spool revolutions during letting out and winding of the fishing line, and an indication unit to indicate the line length determined by the microcomputer.

15 Claims, 8 Drawing Sheets

LINE LENGTH MEASURING DEVICE FOR FISHING REEL

This application is a continuation of application Ser. No. 08/430,176 filed Apr. 27, 1995, now abandoned, which is a continuation of application Ser. No. 08/346,847 filed Nov. 30, 1994, now abandoned, which is a continuation of application Ser. No. 08/242,032 filed May 12, 1994, now abandoned, which is a continuation of application Ser. No. 07/949,717 filed Sept. 23, 1992, now abandoned.

BACKGROUNDS OF THE INVENTION

1 Field of the Invention

This invention relates to a line length measuring device for fishing reel, and in particular relates to a fishing line length measuring device which determines the amount let out or wound up based on the number of revolutions made by the spool.

2 Description of the Prior Art

Recent fishing reels are often capable of measuring the fishing line amount let out from or wound onto the spool so that the user can exactly place a catch on the shelf where fish gather, or have the distance to the catch point indicated in bait casting.

The applicant has already proposed a line length measuring device for fishing reel to measure the fishing line length let out or wound with high accuracy regardless of the line thickness (Japanese Patent Application Laid-open No. 276011/89).

This line length measuring device sets a constant corresponding to the shape of the spool and determines the line length based on this constant, the total number of spool revolutions when the fishing line is wound up to the specified winding diameter level and the actual number of spool revolutions when letting out or winding up the fishing line with using the following formula (1).

Figure 8:
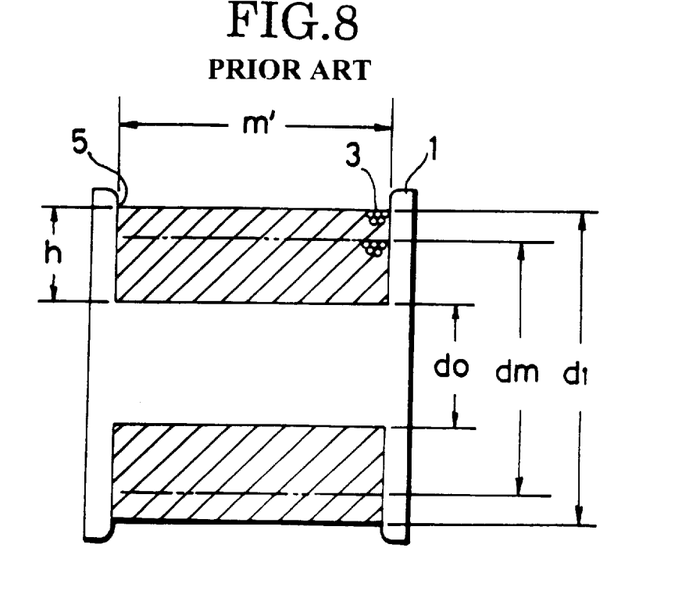
FIG. 8 is a diagram to illustrate a spool in a conventional line length measuring device.

Specifically, referring to FIG. 8, the relation among the number of revolutions made by a spool 1 and the outer winding diameter and the line length of the fishing line 3 wound on the spool 1 when the spool 1 is of a straight type where the winding width m' is constant. In the figure, $d_1$ is the diameter of the wound fishing line 3 at the specified level 5, $d_0$ is the base diameter of the spool 1, $d_m$ is the outer diameter of the wound fishing line 3 varying with letting out and winding, and h is the groove depth of the spool 1 up to the specified winding level 5.

In the above conventional embodiment, the spool 1 makes $n_a$ revolutions changing the winding diameter from $d_1$ to $d_m$, and causes execution of the line length formula stored in the microcomputer ROM:

$$L' = a/n * n_a^2 + b n_a \qquad (1)$$

where n is the total number of revolutions made by the spool 1 when the fishing line 3 is wound onto the spool 1 up to the specified winding level 5, $n_a$ is the actual number of revolutions made by the spool 1 during letting out or winding up of the fishing line 3, a is the constant for h and b is the constant for $d_1$.

The above formula gives the let out line length L' corresponding to the number of revolutions $n_a$ of the spool 1. The total number of revolutions n and the actual number of revolutions $n_a$ made by the spool 1 are counted by the up-down counter and stored on a RAM in the microcomputer.

As shown in FIG. 8, the parameters for the above line length measuring device assuming the actual fishing are given as follows: it sets as the specified winding level 5 the winding diameter $d_1$, which is substantially the same as the maximum winding diameter for the spool 1, and the total number of revolutions of the spool 1 up to the specified winding level 5 determined as such is input to the RAM as the total line length of the fishing line 3, with considering the specified winding diameter level 5 as the base of the winding diameter $d_m$.

Therefore, the angler must first wind the fishing line up to the specified winding level 5, which is close to the maximum winding diameter for the spool 1, and input the total number of revolutions of the spool 1 as the basic data.

Accordingly, if the winding diameter of the fishing line 3 wound on the spool 1 does not reach the specified winding level 5 set near the maximum winding diameter for the spool 1, the basic data cannot be input and the line length formula (1) cannot be performed. Besides, if the angler uses a fishing line 3 having a total length which results in the winding diameter exceeding the specified winding level 5, the part exceeding such level cannot be input as the basic data.

Thus, the above line length measuring device has a drawback that it cannot measure the line length when the winding diameter of the fishing line 3 is smaller or larger than that for the specified winding level 5. For this reason, the angler was forced to add unnecessary fishing line or cut the fishing line 3 exceeding the specified winding level 5 so as to have the line length measuring device function.

SUMMARY OF THE INVENTION

The present invention has been made to solve the problem as described above. It is an object of the present invention to provide a line length measuring device for a fishing reel as an improvement of the above line length measuring device, which is capable of line length measurement regardless of the fishing line length.

According to a preferred embodiment of the present invention to attain this object, a line length measuring device for a fishing reel comprises a reel, a spool which is rotatably supported by the reel and onto which the fishing line is wound, a sensor to detect the revolutions of the spool, an up-down counter to count up or down the pulse signal output from the sensor, a means to count the number of spool revolutions when the fishing line is wound up to the specified winding level smaller than the maximum winding diameter of the fishing line for the spool, and to count the total number of spool revolutions corresponding to the total length of the wound line by using the up-down counter to fetch and store the counted values, an operation means to determine the line length based on the line length formula obtained from the number of spool rotations up to the above specified winding level and the total number of spool revolutions corresponding to the total length of the wound line as well as on the actual number of spool revolutions during letting out and winding of the fishing line, and an indication unit to indicate the line length determined by the operation means.

According to the present invention, the number of spool revolutions when the fishing line is wound up to the specified winding level, the total number of spool revolutions when the fishing line is completely wound up onto the spool and the actual number of spool revolutions are respectively counted by the up-down counter.

These counted values are applied to the line length formula so as to determine the line length, which is indicated at the indication unit.

With the present invention, a line length measuring device can measure the let out or wound up line length with high accuracy for any fishing line having a length sufficient for the specified winding level regardless of the length or thickness. This improves the practicability of the conventional line length measuring device.

DESCRIPTION OF THE PREFERRED EMBODIMENT OF THE INVENTION

Referring to the attached figures, preferred embodiments of the present invention will be described in detail below.

Figure 1:
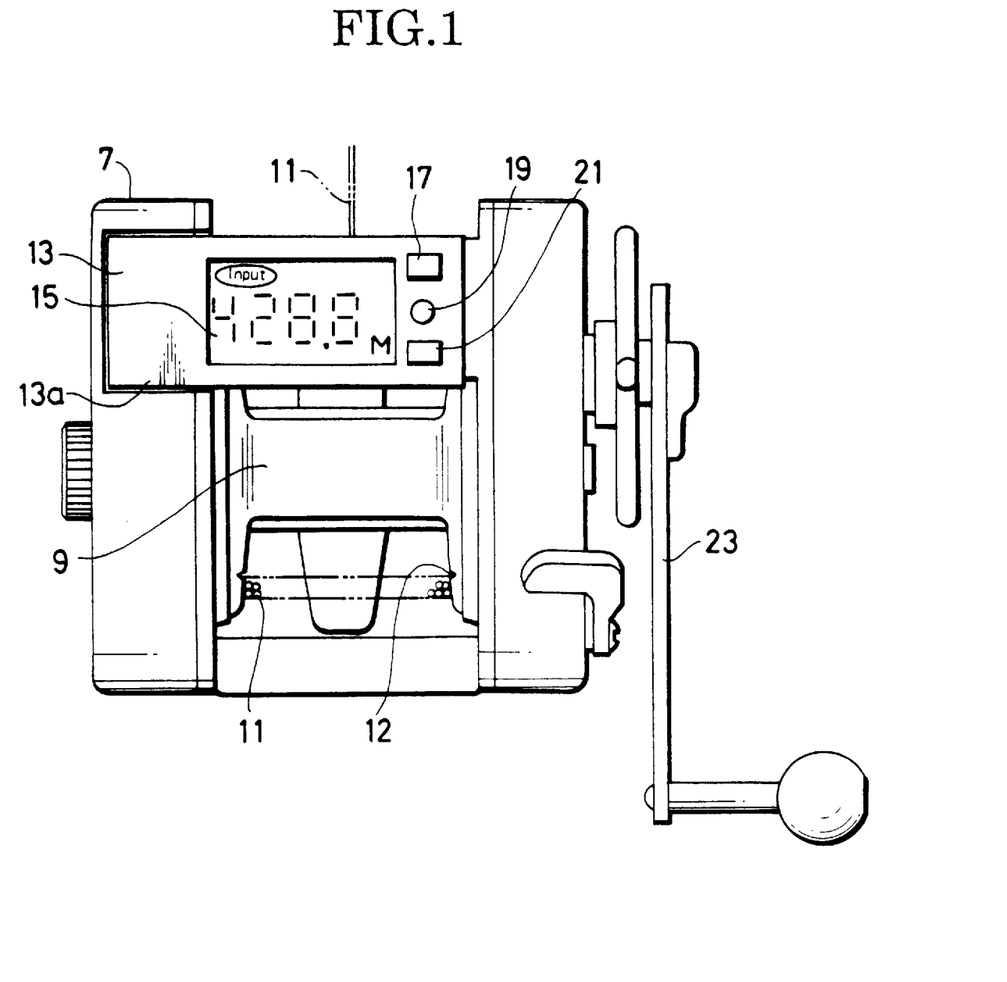
FIG. 1 is a plan view of a fishing reel provided with a line length measuring device according to an embodiment of the present invention.
Figure 2:
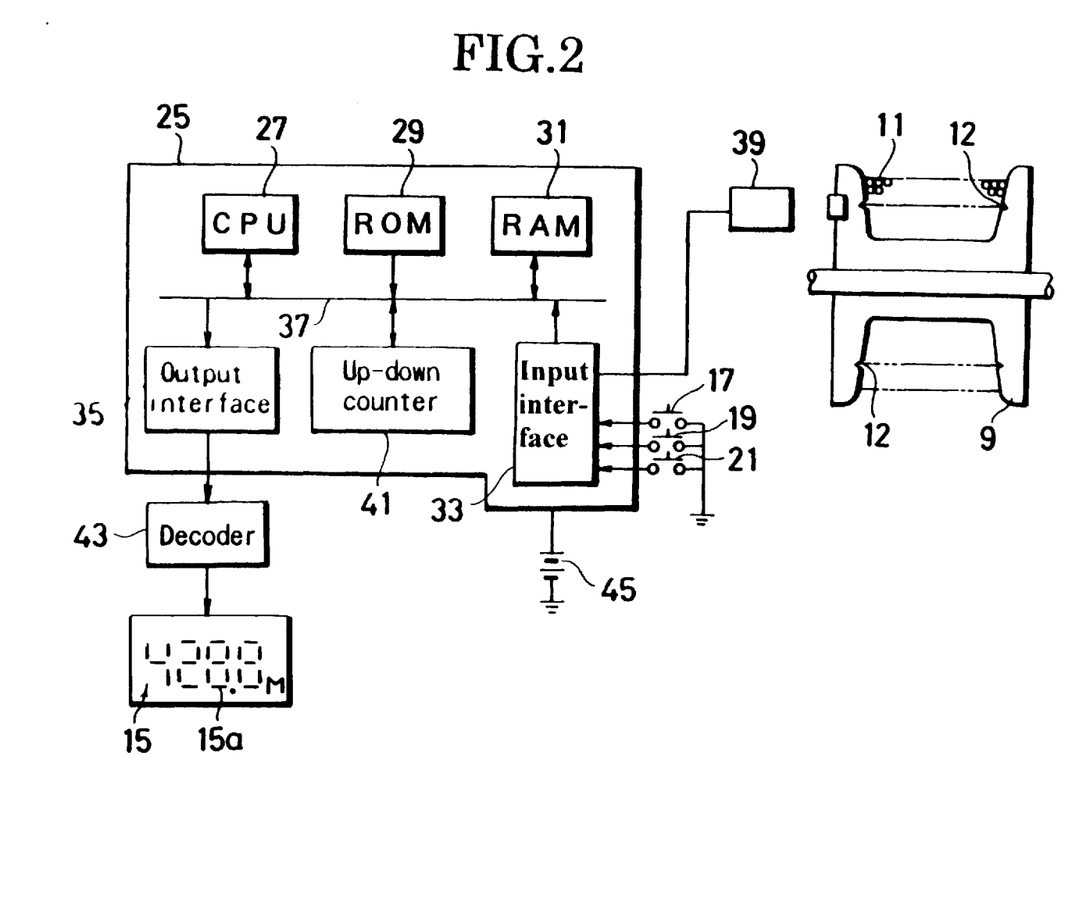
FIG. 2 is a diagram to show the entire configuration of a line length measuring device according to an embodiment of the present invention.
Figure 3:
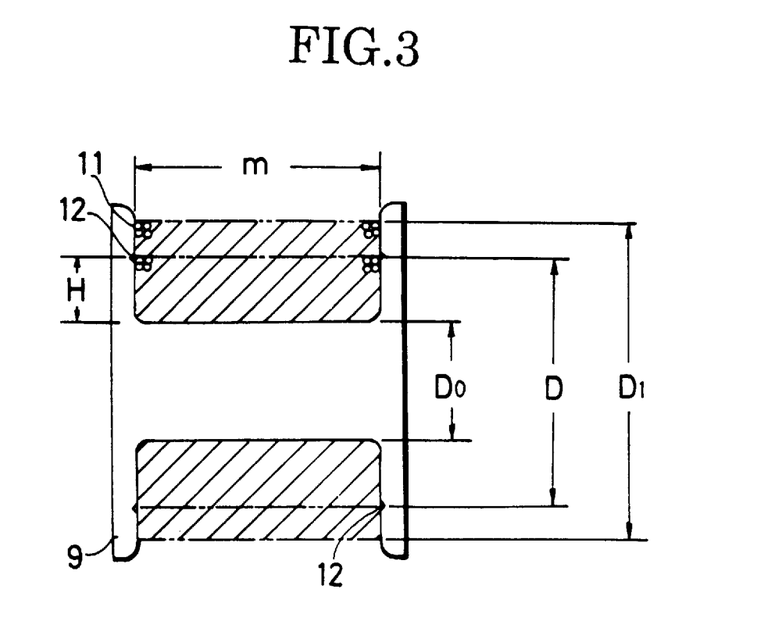
FIG. 3 is a diagram to illustrate a spool in an embodiment of the present invention.

FIGS. 1 to 3 show an embodiment of the present invention. In FIG. 1, the reference numeral 7 indicates a reel, 9 is a spool rotatably mounted onto the reel 7, and 11 indicates a fishing line wound on the spool 9. The spool 9 has on its internal side an engraved indication of a specified winding level 12, which is substantially half of (or smaller than) the maximum winding diameter of the fishing line 11 for the spool 9.

The reference numeral 13 indicates a water-proof flat box integrally mounted on the top of the reel 7. The box 13 has a top panel 13a provided with an indication unit 15, a mode switcher 17, a specified winding level data write switch 19 and a final data write switch 21. In addition, the box 13 water-tightly accommodates a microcomputer for line length calculation and batteries (both described later). The numeral 23 is a handle to rotate the spool 9.

FIG. 2 shows the configuration of the entire line length measuring device according to this embodiment. In the figure, the reference numeral 25 is a microcomputer for line length calculation, line length indication and data writing control, which comprises a CPU (central processing unit) 27 which controls a program memory, data memory and input/output device to execute the operations and transfers required for processing of given jobs, a ROM 29 which stores the operation processing program and the line length formula corresponding to the shape of the spool, a RAM 31 which stores data including the operation results obtained at the CPU 27, an input interface 33 and an output interface 35. These ROM 29, RAM 31, interfaces 33 and 35 are connected with the CPU 27 via a bus 37.

In the figure, the numeral 39 indicates a sensor 39 to detect revolutions of the spool 9 and their direction, which is connected with the input interface 33 of the microcomputer 25. An up-down counter 41 is set to increment or decrement status by the signal from judgment whether the spool 9 makes forward or reverse revolutions output from the sensor 39 sent into the CPU 27 via the input interface 33. The counter counts up or down the revolution pulse signal of the spool 9 taken from the sensor 39 via the input interface 33.

In addition, the above input interface 33 is connected with a mode switcher 17 for switching to data input, line length indication or data modification mode, a specified winding level data write switch 19, and a final data write switch 21.

Further, the above output interface 35 is connected with an indication unit via a decoder 43. The indication unit 15 is further provided with an indicator 15a for digital indication of the line length. The reference numeral 45 in the figure indicates a battery power supply for operation of the microcomputer 25 and the indication unit 15.

Referring now to FIG. 3 where the spool 9 is of the straight type with a fixed winding width m, as in the conventional device of FIG. 8, there is shown the relation between the number of revolutions made by the spool 9 and the outer winding diameter and the line length of the fishing line 11 wound onto the spool 9. In the figure, D is the winding diameter when the fishing line 11 is wound to the specified winding level 12, $D_0$ is the diameter of the base of the spool 9, $D_1$ is the diameter when the fishing line 11 is totally wound up, and H is the groove depth of the spool 9 up to the specified winding diameter level 12.

In this embodiment, with winding up the fishing line 11, the number of revolutions N made by the spool 9 until the diameter reaches the specified winding level 12, and then the total number of revolutions $N_e$ made by the spool 9 when thy fishing line 11 is fully wound onto the spool 9 causing a winding diameter to be $D_1$ are input. The let out line length L corresponding to the actual number of revolutions $N_a$ of the spool 9 can be determined using the following formula stored in the ROM 29 of the microcomputer 25:

$$L = dN_a^2 + eN_a \qquad (2)$$

where $N_a$: actual number of revolutions made by the spool 9 when the fishing line 11 is let out or wound up $d = \pi H/N$: constant $e = \pi(D_0 + 2HN_e/N)$: constant $N_e$: total number of revolutions of the spool 9 for the entire line length, and N: number of revolutions of the spool 9 when the fishing line 11 is wound up to the specified winding level 12.

The number of revolutions N of the spool 9 up to the winding level 12 and the total number of revolutions $N_e$ of the spool 9 up to the full winding diameter $D_1$, and the actual number of revolutions $N_a$ made by the spool 9 are counted by the up-down counter 41 and stored in the RAM 31 of the microcomputer 25.

Figure 4:
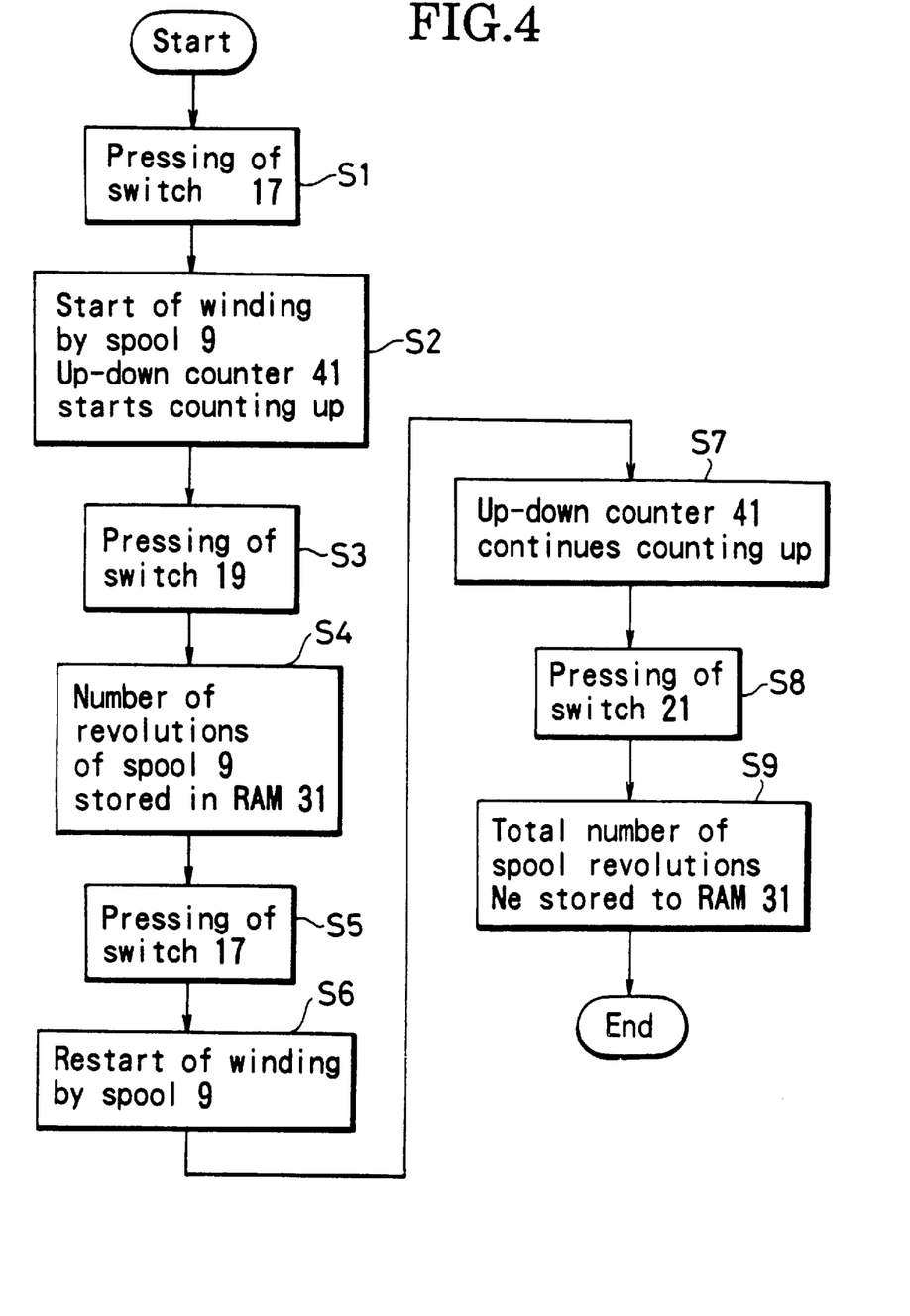
FIG. 4 is a flowchart to show the steps of data input.

Next, referring to the flowchart in FIG. 4, input of the number of revolutions N and the total number of revolutions $N_e$ made by the spool 9 when the fishing line 11 starting from the spool base diameter $D_0$ is wound to the diameter D and then $D_1$ is described below.

Firstly, the battery power supply 45 is connected and the microcomputer 25 is initialized for starting. Pressing of the mode switcher 17 (Step S1) under such conditions sets the microcomputer 25 to the spool revolution input mode.

Then, with an end of the fishing line 11 bound to the base of the spool 9, the handle 23 is rotated so that the spool 9 makes revolutions and winds up the fishing line 11. Here, a line guide in a level winder mechanism (not shown) travels across the width of the spool 9 synchronizing the revolutions of the spool 9, and the fishing line 11 is wound onto the spool 9 with uniform level and density.

When the spool 9 makes revolutions in the winding direction, the up-down counter 41 is set to the increment mode and the pulse signal for each spool revolution output from the sensor 39 is sent to the up-down counter 41 via the input interface 33 for sequential increase in count (Step S2).

When it is visually ensured that the fishing line 11 is wound up to the winding diameter D for the specified winding level 12, winding of the fishing line 11 is stopped and the specified winding level data writing switch 19 is pressed (Step S3). Then, the count at the counter 41 is stored in the RAM 31 as the number of revolutions N of the spool 9 up to the winding level 12 (Step S4). Based on this basic data, the above constant $d=-\pi H/N$ for the specified winding level 12 is determined.

Next, the mode switcher 17 is pressed again to set the microcomputer 25 to the spool revolution input mode (Step S5), and the handle 23 is further rotated so as to wind up the fishing line 11 completely (Step S6). When the spool 9 restarts revolutions in winding direction, the pulse signal for each revolution of the spool 9 output from the sensor 39 is sent to the up-down counter 41 via the input interface 33 and the increase in count is continued (Step S7).

After winding the fishing line 11 up to the specified winding level 12 and the pressing of the specified winding level data write switch 19 to input the constant $d=-\pi H/N$, the step S5 above can be omitted so as to continuously wind up the fishing line 11 completely in input mode.

When the fishing line 11 is wound up to the specified winding level 12 and the specified winding level data writing switch 19 is pressed, the indication unit 15 may indicate the number of spool revolutions N up to the specified winding level 12 or the length of the wound line up to the specified winding level 12 with calculating the line length based on $N=N_i°$. Further, the length of the wound line until complete winding up of the fishing line 11 with rotating the handle 23 may be indicated on the indication unit 15 using the values calculated based on the number of spool revolutions ($N_e'$, $N_e''$, ...).

When the fishing line 11 is completely wound up, or until the winding diameter reaches the full winding diameter $D_1$ on the spool 9, the final data write switch 21 is to be pressed (Step S8). This causes the count at the up-down counter 41 to be stored in the RAM 31 as the total number of revolutions Ne of the spool 9 up to the full winding diameter $D_1$ (Step S9). From this value, the constant $e=\pi(D_0+2HN_e/N)$ for the full line length is determined, which completes the determination of the constants d and e in the line length formula (2).

Figure 5:
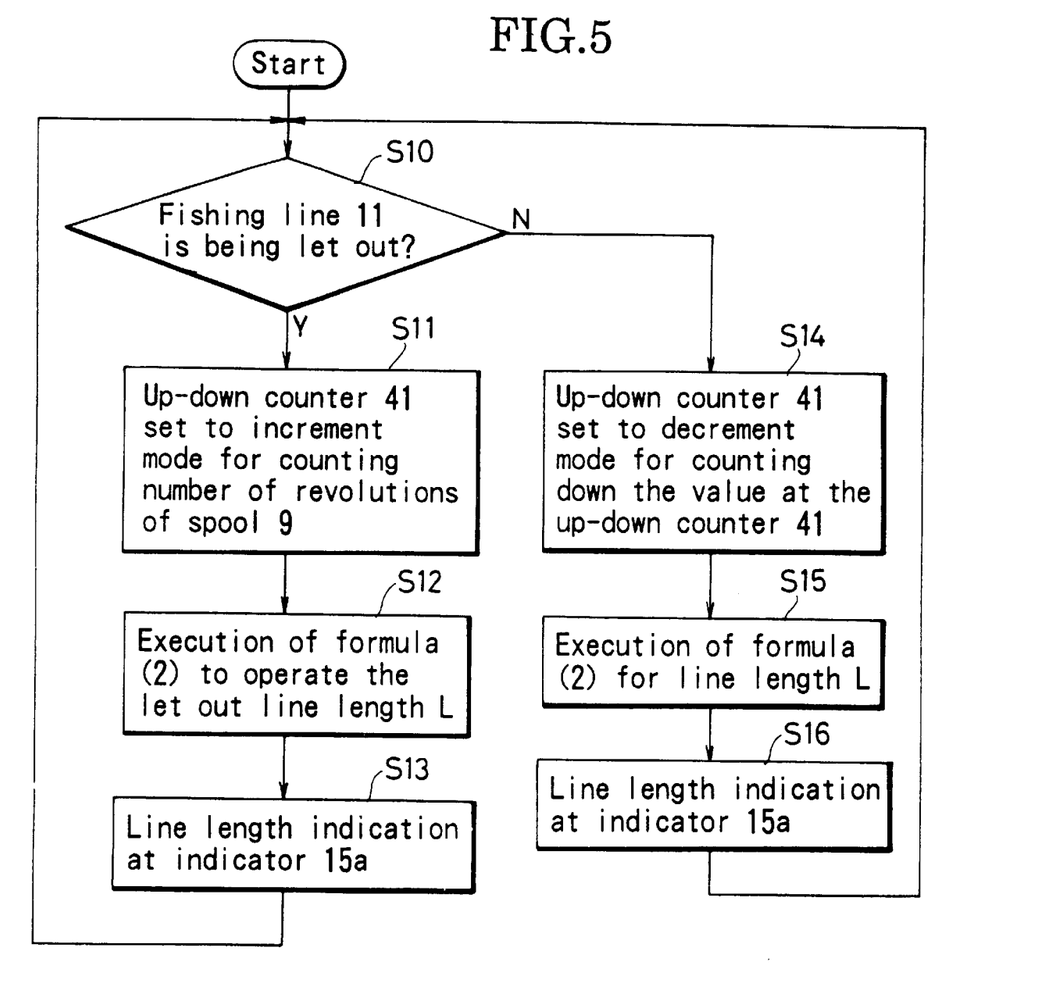
FIG. 5 is a flowchart to show the steps of line length measurement and indication.
Figure 6:
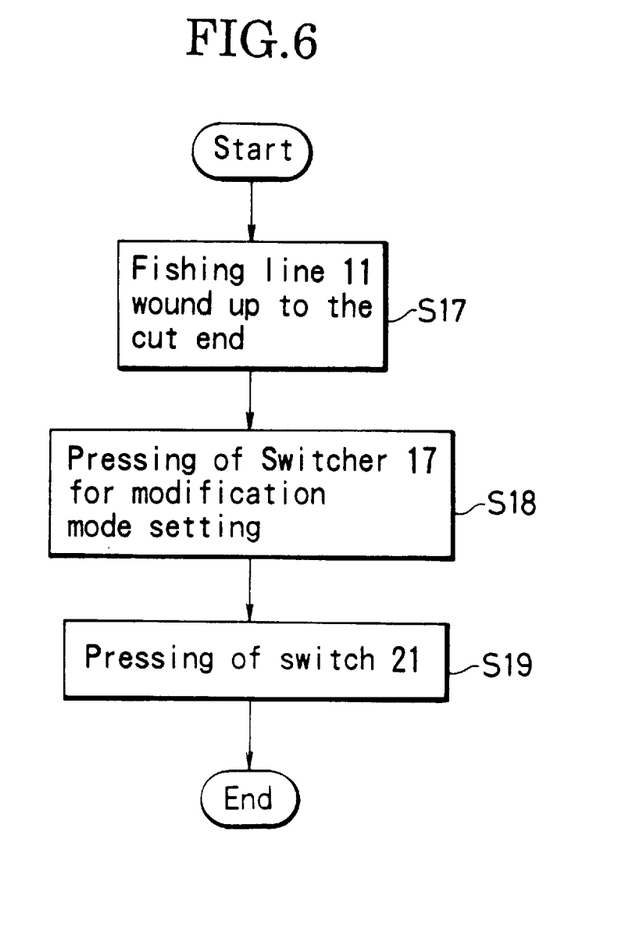
FIG. 6 is a flowchart to show the steps of modification in the event of line cut.

Now referring to the flowcharts of FIGS. 5 and 6, the line length measurement and the modification in the event of line cut are described. These mechanisms are the same as those used in a line length measuring device disclosed in the Japanese Patent Application Laid-open No. 276011-1989 .

Referring first to FIG. 5, when the program starts, it is judged whether the fishing line 11 is let out or not in Step S10. If it is judged that the fishing line 11 is being let out, the spool 9 makes revolutions in forward direction with letting out the fishing line 11 and the signal for forward direction from the sensor 39 is sent to the CPU 27 via the input interface 33. This sets the up-down counter 41 to the increment mode and the pulse signal generated for each revolution of the spool 9 output from the sensor 39 is sent to the up-down counter 41 via the input interface 33 for sequential increase in count (Step S11).

In the next step S12, the count $N_a$ at the up-down counter is taken into the CPU 27 for each operation cycle of the microcomputer 25. The above line length formula (2) is executed using this count and the result is output to the indication unit 15 via the output interface 35 and the decoder 43, so as to digitally indicate the let out line length L of the fishing line 11 at the indicator 15a.

On the other hand, if it is judged that the fishing line 11 is being wound up in Step S10, the spool 9 makes revolutions in reverse direction with winding up of the fishing line 11. The signal for reverse direction from the sensor 39 is sent to the CPU 27 via the input interface 33, causing the up-down counter to enter the decrement mode, where the pulse signal from the sensor 39 generated for reverse revolutions of the spool 9 is sent to the up-down counter 41, which decrements the value counted during letting out (Step S14).

Then, in the next step S15, the count $N_a$ at the up-down counter 41 is taken into the CPU 27 for each operation cycle of the microcomputer 25. The line length formula (2) is executed so that the line length L obtained by subtracting the wound line length from the let out length can be determined and output to the indication unit 15 for digital indication at the indicator 15a (Step 16).

Figure 7:
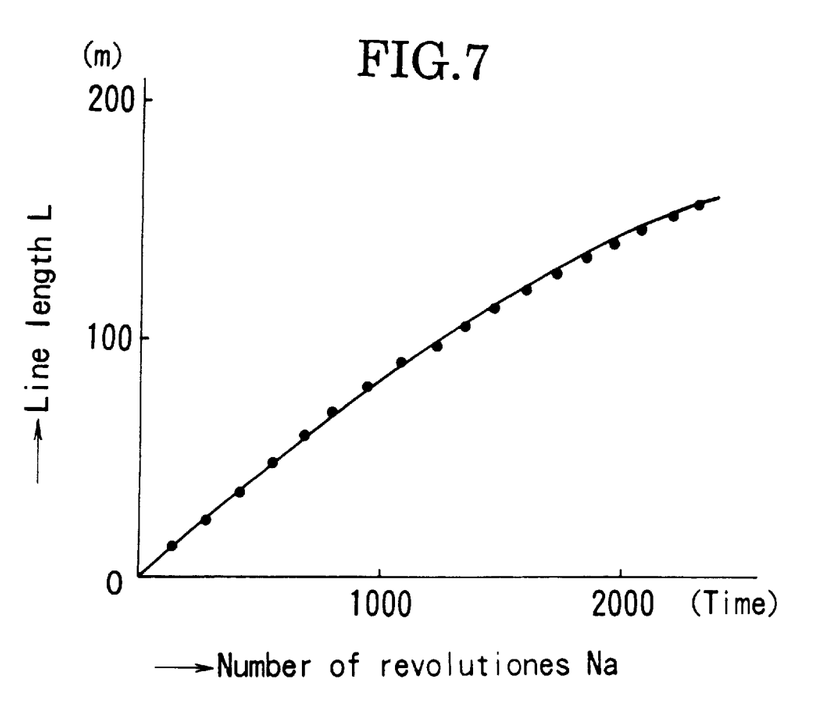
FIG. 7 is a graph to show the relation between the line length and the number of spool revolutions.

FIG. 7 is a graph showing the relation between the number of revolutions $N_a$ made by the spool 9 and the line length L. Values obtained from the line length formula (2) are as shown by the solid line and the actually measured values are as shown by the black circles. As understood from this graph, there is only a small gap between the calculated and actually measured values. The gap is ensured to be in the range of 0.3%.

Next, modification in total number of revolutions in the event of line cut.

In this case, as shown in the flowchart of FIG. 6, the handle 23 is firstly rotated to wind the line onto the spool 9 so that the cut end of the line comes immediately before the reel 7 or the rod end (Step S17). In the next step S18, the microcomputer 25 is set to enter the modification made by pressing of the mode switcher 17.

After the microcomputer 25 enters the modification mode, pressing of the final data write switch 21 (Step S19) causes the remaining count $N_b$ at the up-down counter 41 (the value obtained by subtracting the number of revolutions made by the spool 9 when winding the line up to the cut end from the number of spool revolutions counted during letting out) to be stored in the RAM 31. Now, the line length L is to be determined with the remaining count $N_b$ added to the number of revolutions $N_a$ thereafter counted by the up-down counter 41. The pressing of the final data write switch 21 completes the modification of the count due to line cut and returns the device to the original indication mode.

Since FIG. 6 is for letting out of the fishing line 11, $N_b$ is to be subtracted for winding up of the fishing line 11.

This embodiment thus realizes highly accurate measurement of the let out or wound up line length regardless of the thickness of the fishing line 11 as in the line length measuring device in the Japanese Patent Application Laid-open No. 276011/1989. In addition, this embodiment has a following advantage.

As already described referring to FIG. 8, a conventional line length measuring device requires input of the total number of revolutions n made by the spool 1 until the diameter reaches the specified winding level 5 set at the diameter $d_1$, which is substantially the same as the maximum winding diameter for the spool 1, as the total line length of the fishing line 3, and uses the specified winding level 5 as the base point of the let out diameter dm. This means that the line length formula (1) cannot be executed due to lack of basic data when the diameter of the fishing line 3 wound onto the spool 1 does not reach the specified winding level 5 and when the fishing line 3 has a winding diameter exceeding the specified winding level 5, where the basic data cannot be input for the part exceeding the specified winding level 5.

Therefore, such a conventional line length measuring device has a drawback that it cannot perform line length measurement when the fishing line 3 has an excessive or insufficient winding diameter compared with the specified winding level 5.

In this embodiment, however, the specified winding level 12 is set in the halfway in winding of the fishing line 11 onto the spool 9. When the fishing line 11 is wound up to this specified winding level 12, the number of revolution of the spool 9 up to the winding level 12 is input first. Then, the total number of revolutions $N_e$ of the spool 9 when the fishing line 11 is completely wound up is input for execution of the line length formula (2). Accordingly, any fishing line having a length reaching the specified winding level 12 can be used regardless of the length with capability of line length measurement. As in the conventional devices, the device according to this embodiment realizes easy data input with one-touch operation of the specified winding level data write switch 19 and the final data write switch 21, and can be used for any type of line. This improves the practicability of the line length measuring device.

In the above embodiment, it is visually judged whether the fishing line 11 is wound up to the specified winding level 12 of the spool 9 and the specified winding level data write switch 19 is operated after such judgment. However, the applicant has already filed Utility Model Applications for specified winding amount detector for fishing reels to automatically and securely detect that the fishing line is wound to the predetermined level as Utility Model Application No. 48847/1990 and No. 48848/1990.

The specified winding amount detector disclosed in the Utility Model Application No. 48847/1990 comprises a fishing reel provided with a spool for fishing line winding rotatably supported thereon, and the reel is further provided with a specified winding amount detector which indicates the proper winding amount of the fishing line according to a contact with the fishing line when the fishing line wound onto the spool reaches the specified amount. Besides, the specified winding amount detector according to the Utility Model Application No. 48848/1990 comprises a specified winding amount detector which is rotatably disposed on the reel and in contact with the outer circumference of the fishing line under predetermined pressure, a displacement mechanism to displace the above specified winding amount detector to the predetermined position when the fishing line wound onto the spool is wound up to the specified amount and a sensor to detect the displacement of the specified winding amount detector.

Therefore, if any of these specified winding amount detectors is mounted to the line length measuring device according to the present invention, higher accuracy can be realized without the need of visual judgment.

Though a straight type spool 9 is used in the above embodiment, the spool can be of taper type having different values for the winding width at the base (diameter: $D_0$) and for the winding width when the fishing line 11 is wound up to the specified winding level 12 (diameter: D). For such a spool, highly accurate measurement can be realized by setting these winding width values as constants in addition to D and H.

Besides, it is needless to say that the device to detect the number of spool revolutions can be a known device to detect revolutions of a rotating unit which makes revolutions in connection with the spool 9.

What is claimed is:

1. A fishing reel with capability for calculating and displaying calculated fishing line length without first requiring of the user that the fishing line be wound to a specified winding level near a maximum winding level, the reel comprising:

a reel body;

a spool which is rotatably supported by the reel body and on which a fishing line is wound;

sensor means for detecting a number of revolutions and a direction of revolutions of the spool, and for providing signals corresponding to the rotational frequency of the spool;

the spool having a specified winding level substantially less than a maximum winding diameter of the fishing line for the spool and means carried by the spool indicating the specified winding level substantially less than the maximum winding diameter;

a microcomputer, including an up/down counter which is incremented by the signals from the sensor means, the up/down counter counting the number of revolutions made by the spool when the fishing line is wound up, the up/down counter also being selectively capable of being decremented by the signals from the sensor means and for counting the number of revolutions made by the spool when the fishing line is let out;

the microcomputer including means for selectively storing, as respective number values the number of spool revolutions when the fishing line is wound up to the specified winding level, a total number of spool revolutions corresponding to the total length of fishing line when the fishing line is wound up; and an actual number of spool revolutions when the fishing line is let out or wound up;

the microcomputer including a CPU for calculating the length of the wound up portion and the length of the let out portion of the fishing line according to a stored formula, the stored formula using a number value of spool revolutions when the fishing line is wound to the specified winding level and a total number value of spool revolutions, the stored formula for calculating length of fishing line as a function of the number of revolutions made by the spool, wherein the formula is of the form $$L = dN_a^2 + eN_a$$

where L is the length of fishing line let out, d is a constant determined by a groove depth of the reel, defined by the depth of the spool up to the specified winding level, and the number of revolutions made by the spool when the fishing line is wound up to the specified winding level, $N_a$ is the actual number of revolutions made by the spool when the fishing line is let out or wound up, and e is a constant determined by a diameter at the base of the spool, the number of revolutions made by the spool when the total length of the fishing line is completely wound on the spool, and the number of revolutions made by the spool when the fishing line is wound up to the specified winding level;

the microcomputer including ROM means for storing an operation processing program and the length of fishing line calculation formula;

the microcomputer including RAM means for storing data as results of operation by the CPU; and an indication unit driven by the microcomputer for displaying the calculated length of fishing line.

2. A fishing reel according to claim 1 wherein the means carried by the spool indicating the specified winding level the spool comprises an indentation on the spool for indicating the specified winding level.

3. A fishing reel according to claim 1 wherein the constant e is of the form $$e = \pi(D_0 + 2HN_e/N)$$

where $D_0$ is the diameter of a base of the spool, H is the groove depth of the spool up to the specified winding level, $N_e$ is the total number of revolutions of the spool for the total length of the fishing line, and N is the number of revolutions of the spool when the fishing line is wound up to the specified winding level.

4. A fishing reel according to claim 1 wherein the constant d is of the form $$d = -\pi H/N$$

where H is the groove depth of the spool up to the specified winding level, and N is the number of revolutions of the spool when the fishing line is wound up to the specified winding level.

5. A fishing reel according to claim 1 wherein the means for selectively counting the number values comprises mode switches for user selections of operation modes by the microcomputer.

6. A fishing reel according to claim 1 further comprising an input interface for receiving signals from the sensor corresponding to each spool rotation.

7. A fishing reel according to claim 1 further comprising an output interface for providing the calculated length of fishing line to the indication unit.

8. A fishing reel with capability for calculating and displaying calculated fishing line length without first requiring of the user that the fishing line be wound to a specified winding level near a maximum winding level, the reel comprising:

a reel body;

a spool which is rotatably supported by the reel body and on which a fishing line is wound;

sensor means for detecting a number of revolutions and a direction of revolutions of the spool, and for providing signals corresponding to the rotational frequency of the spool;

the spool having a specified winding level substantially less than a maximum winding diameter of the fishing line for the spool and means carried by the spool indicating the specified winding level substantially less than the maximum winding diameter;

a microcomputer, including an up/down counter which is incremented by the signals from the sensor means, the up/down counter counting the number of revolutions made by the spool when the fishing line is wound up, the up/down counter also being selectively capable of being decremented by the signals from the sensor means and for counting the number of revolutions made by the spool when the fishing line is let out;

the microcomputer including means for selectively storing, as respective number values the number of spool revolutions when the fishing line is wound up to the specified winding level, a total number of spool revolutions corresponding to the total length of fishing line when the fishing line is wound up; and an actual number of spool revolutions when the fishing line is let out or wound up;

the microcomputer including a CPU for calculating the length of the wound up portion and the length of the let out portion of the fishing line according to a stored formula which is a function of the length of the fishing line determined by the total number of spool revolutions when the fishing line is wound to the specified winding level and a total number value of spool revolutions, the stored formula calculating length of fishing line as a function of the number of revolutions made by the spool in winding off and winding on the fishing line from the spool, the microcomputer including ROM means for storing an operation processing program and the length of fishing line calculation formula;

the microcomputer including RAM means for storing data as results of operation by the CPU; and an indication unit driven by the microcomputer for displaying the calculated length of fishing line.

9. A fishing reel according to claim 8 wherein the means carried by the spool indicating the specified winding level the spool comprises an indentation on the spool for indicating the specified winding level.

10. A fishing reel according to claim 9 wherein the formula is a polynomial of the quadratic form $$L = dN_a^2 + eN_a$$

where L is the length of fishing line let out, d is a constant determined by a groove depth of the reel, defined by the depth of the spool up to the specified winding level, and the number of revolutions made by the spool when the fishing line is wound up to the specified winding level, $N_a$ is the actual number of revolutions made by the spool when the fishing line is let out or wound up, and e is a constant determined by a diameter at the base of the spool, the number of revolutions made by the spool when the total length of the fishing line is completely wound on the spool, and the number of revolutions made by the spool when the fishing line is wound up to the specified winding level.

11. A fishing reel according to claim 10 wherein the constant e is of the form $$d = -\pi H/Ne = \pi D_0 + 2HN_e/N)$$

where $D_0$ is the diameter of a base of the spool, H is the groove depth of the spool up to the specified winding level, $N_e$ is the total number of revolutions of the spool for the total an length of the fishing line, and N is the number of revolutions of the spool when the fishing line is wound up to the specified winding level.

12. fishing reel according to claim 9 wherein the constant d is of the form $$d = -\pi H/N$$

where H is the groove depth of the spool up to the specified winding level, and N is the number of revolutions of the spool when the fishing line is wound up to the specified winding level.

13. A fishing reel according to claim 9 wherein the means for selectively counting the number values comprises mode switches for user selections of operation modes by the microcomputer.

14. A fishing reel according to claim 9 further comprising an input interface for receiving signals from the sensor corresponding to each spool rotation.

15. A fishing reel according to claim 9 further comprising an output interface for providing a calculated length of fishing line to the indication unit.

* * * * *

UNITED STATES PATENT AND TRADEMARK OFFICE
CERTIFICATE OF CORRECTION

PATENT NO. : 5,833,154
DATED : November 10, 1998
INVENTOR(S) : KANEKO, K.

It is certified that error appears in the above-identified patent and that said Letters Patent is hereby corrected as shown below:

Column 4, line 36, delete "$d= \pi H/N$" and insert --$d=-\pi H/N$--.

IN THE CLAIMS:

Claim 11, column 10, line 32, delete "$d=-\pi H/Ne=\pi D_o+2Hn_e/N)$" and insert -- $e=\pi(D_o+2HN_e/N)$--.

Signed and Sealed this

Sixteenth Day of May, 2000

Attest:

Q. TODD DICKINSON

*Attesting Officer*     *Director of Patents and Trademarks*